United States Patent [19]

Satran

[11] Patent Number: 4,890,523
[45] Date of Patent: Jan. 2, 1990

[54] TOOL CUTTER HEAD
[75] Inventor: Amir Satran, Kiryat Bialik, Israel
[73] Assignee: Iscar Ltd., Nahariya, Israel
[21] Appl. No.: 218,658
[22] Filed: Jul. 13, 1988
[51] Int. Cl.$^4$ .............................................. B23B 29/04
[52] U.S. Cl. ........................................ 82/158; 82/160
[58] Field of Search .................. 407/46, 101, 102; 82/158, 159, 160; 408/198, 232; 403/221, 226, 220, 222, 223, 224, 225, 227, 228, 229

[56] References Cited

U.S. PATENT DOCUMENTS 2,874,597 2/1959 Bach ........................................ 82/158
4,092,078 5/1978 Klotz ..................................... 403/221
4,270,422 6/1981 Anderson ............................... 82/158

Primary Examiner—Frederick R. Schmidt
Assistant Examiner—Blynn Shideler
Attorney, Agent, or Firm—Burgess, Ryan & Wayne

[57] ABSTRACT

A cutter head releasably mounted on a tool holder and to be fitted with an exchangeable cutting insert while the tool holder is adapted to be secured to a lathe or the like; a substantially U-shaped bushing being articulatedly mounted in a recess formed in an end of the cutter head so as to define a receiver socket adapted to receive an engaging head of a drawbar longitudinally displaceable within the tool holder; the arrangement being such that with the engaging head of the drawbar located in said receiver socket, a traction force exerted on the drawbar results in transverse abutting surfaces of the bushing being displaced into a clamping abutment with corresponding transverse abutment surfaces formed on the tool holder.

5 Claims, 5 Drawing Sheets

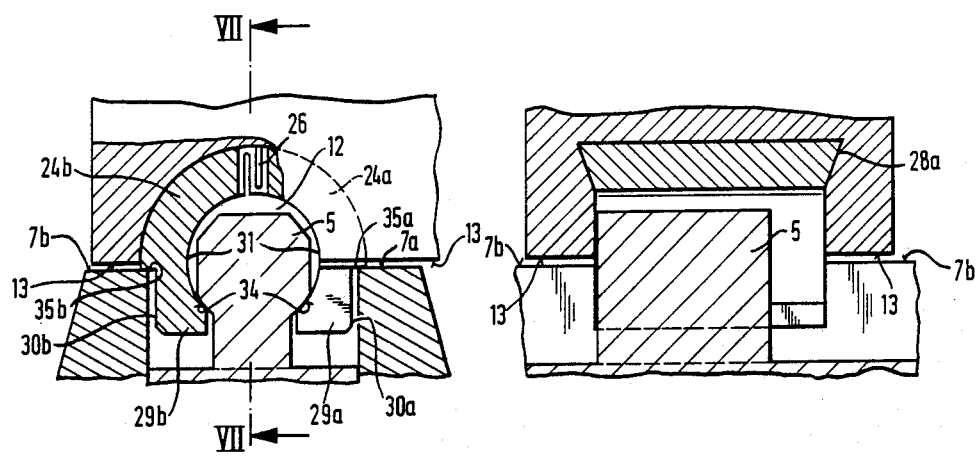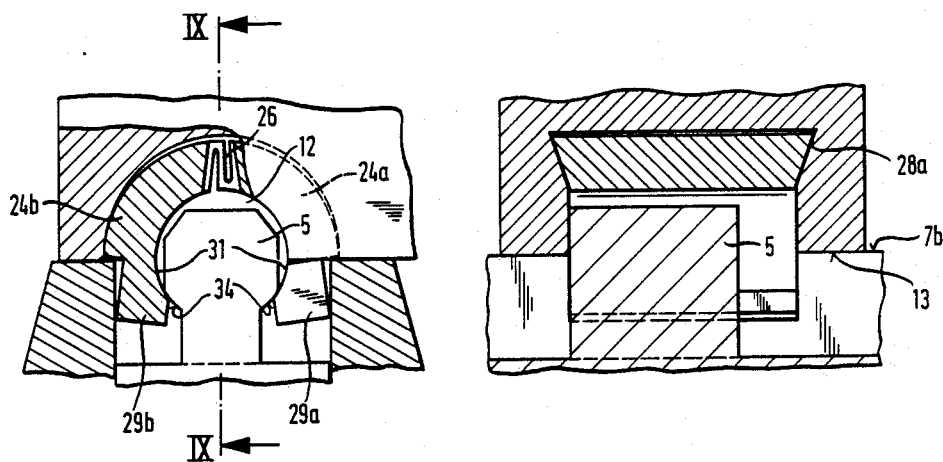

1

TOOL CUTTER HEAD

FIELD OF THE INVENTION

This invention relates to a tool cutter head adapted to be releasably mounted on a tool holder, the tool cutter head being adapted to be fitted with an exchangeable cutting insert whilst the tool holder is adapted to be secured to a lathe or the like.

BACKGROUND OF THE INVENTION

The use of such tool cutter heads which are releasably mounted on a tool holder so as to be firmly secured thereto in such a manner as to minimize the danger of relative movement between the tool cutter head and the tool holder has been previously proposed. In this connection reference is made to Swiss Patent Specification No. 249,179, Swedish Patent Specification No. 40469, Japanese Utility Patent Application (Kokai) No. 52-165388 and U.S. Pat. No. 4,270,422. The latter document discloses the provision of a tool cutter head designed to have a cutter insert mounted thereon, the cutter head being designed to be clamped against a tool holder by means of a drawer which is axially moveable within the tool holder. For this purpose the tool cutter head is formed, at one end thereof with a recess having a restricted opening defined between a pair of flanges which project from and are formed integrally with the tool head. The drawbar is formed with an engaging head which projects out of that end of the tool holder opposite the one end of the tool cutter head and between a pair of abutment surfaces formed integrally with the tool holder. The engaging head is receivable in the recess with the projecting flanges bounding a neck portion of the drawbar, juxtaposed surfaces of the engaging head and the projecting flanges constituting respective cam surfaces such that displacement of the drawbar into the tool holder results in the clamping of the head against the tool holder including the outward displacement of the flanges against the abutment surfaces.

With this hitherto proposed tool cutter head the effectiveness of the clamping thereof against the tool holder and in consequence the degree of stability of the entire tool assembly depends on the effective displacement in order to achieve an effective contact of the projecting flanges against the abutment surfaces. With the flanges formed integrally with the tool head there is an inherent limit on the degree of elastic deformation which these flanges can bear under the influence of the displaced engaging head of the drawbar without fracturing or otherwise undergoing non-reversible deformation. Furthermore, should fracture or non-reversible deformation of the flanges occur, the entire tool head is rendered non-operational and must be entirely replaced.

SUMMARY OF THE INVENTION

It is an object of the present invention to provide a new and improved tool cutter head adapted to be releasably mounted on a tool holder in which the above referred to disadvantages are substantially reduced or 15 overcome.

According to the present invention there is provided a tool cutter head adapted to be releasably mounted on a tool holder and comprising a body portion; cutting insert mounting means located at a first end of the body portion; a substantially U-shaped bushing articulatedly mounted in a recess formed in a second end of the body portion and defining a receiver socket adapted to receive an engaging head of a drawbar longitudinally displaceable within the tool holder; juxtaposed surfaces of said recess and said bushing constituting a first pair of coacting cam surfaces; constituent limbs of said bushing being capable of limited displacement towards and away from each other along paths determined by said coacting cam surfaces; limb terminal portions projecting out of said second end and defining at their extremities a socket entry slot having transverse dimensions less than those of the socket and greater than those of a neck portion of said drawbar adjacent said engaging head; transverse abutment surfaces formed on said second end of said body portion on either side of said limb terminal portions and adapted to be juxtaposed with respect to corresponding transverse abutment surfaces formed on said tool holder; outer surfaces of said limb terminal portions constituting respective, longitudinally directed, abutment surfaces adapted to be juxtaposed with respect to corresponding longitudinally directed, abutment surfaces formed on said tool holder; inner surfaces of said terminal portions being juxtaposed with respect to corresponding surfaces on said engaging head and constituting a second pair of coacting cam surfaces; the arrangement being such that with said engaging head of said drawbar located in said receiver socket, a traction force exerted on said drawbar results in the transverse abutting surfaces of said limb terminal portions being displaced into a clamping abutment with the corresponding transverse abutment surfaces formed on said tool holder.

With such a tool cutter head in accordance with the present invention the outward displacement of the limb terminal portions of the bushing as a result of the displacement of the engaging head of the drawbar towards the tool holder involves the displacement of the constituent limbs of the bushing towards each other and such displacement can be obtained more readily than the corresponding displacement of the projecting flanges formed integrally with the tool cutter head in accordance with the prior art. Furthermore, such displacement of the constituent limbs of the bushing is much less likely to result in the fracture of these limbs than the corresponding displacement of the integrally formed projecting flanges in accordance with the prior art. If, however, fracture of the limbs does result this will not necessitate replacement of the entire tool cutter head as would be the case in accordance with the prior art but will merely require the replacement of the bushing.

BRIEF DESCRIPTION OF THE DRAWINGS

For a better understanding of the present invention and to show how the same may be carried out in practice reference will now be made to the accompanying drawings in which:

FIG. 6 is a plan view from above showing, on an enlarged scale, portions of the assembled tool cutter head in accordance with the invention and the tool holder prior to clamping as seen in FIG. 3 and partially cross-sectional along the line VI—VI, FIG. 7 is a cross-sectional view of the assembled tool as shown in FIG. 6 taken along the line VII—VII, FIG. 8 is a view corresponding to that of FIG. 6 with the tool cutter head firmly clamped against the tool holder, and FIG. 9 is a cross-sectional view of the assembled clamped tool as shown in FIG. 8 taken along the line IX—IX.

DETAILED DESCRIPTION OF A PREFERRED EMBODIMENT

Figure 1:
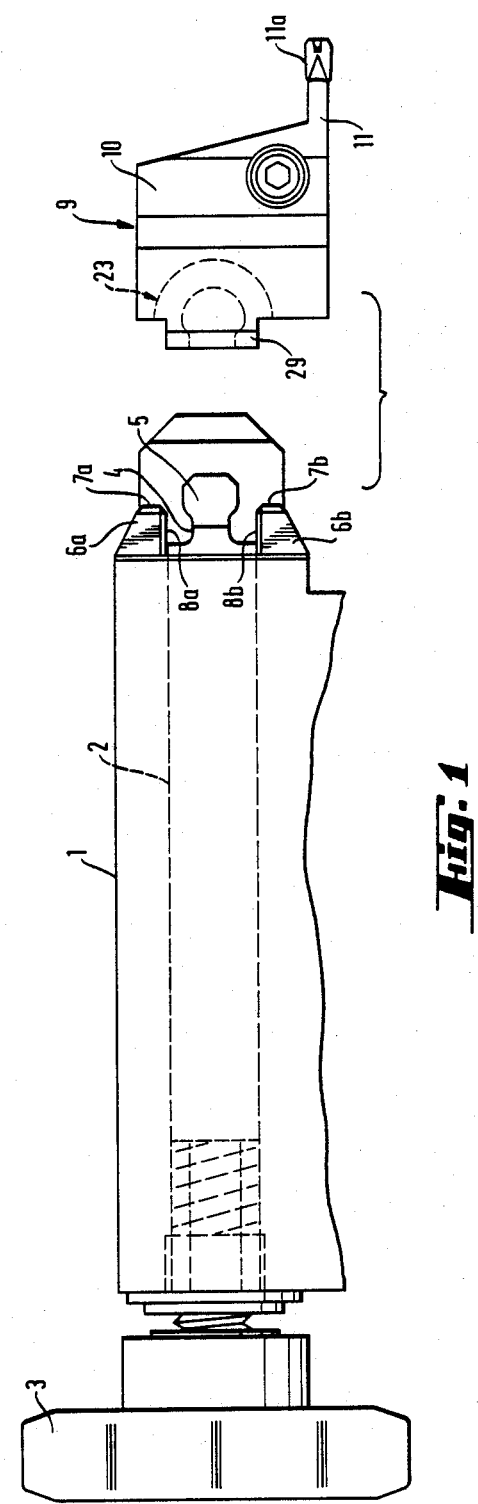
FIG. 1 is a plan view from above of a composite tool comprising a tool holder and a tool cutter head in accordance with the invention for mounting on the tool holder.
Figure 2:
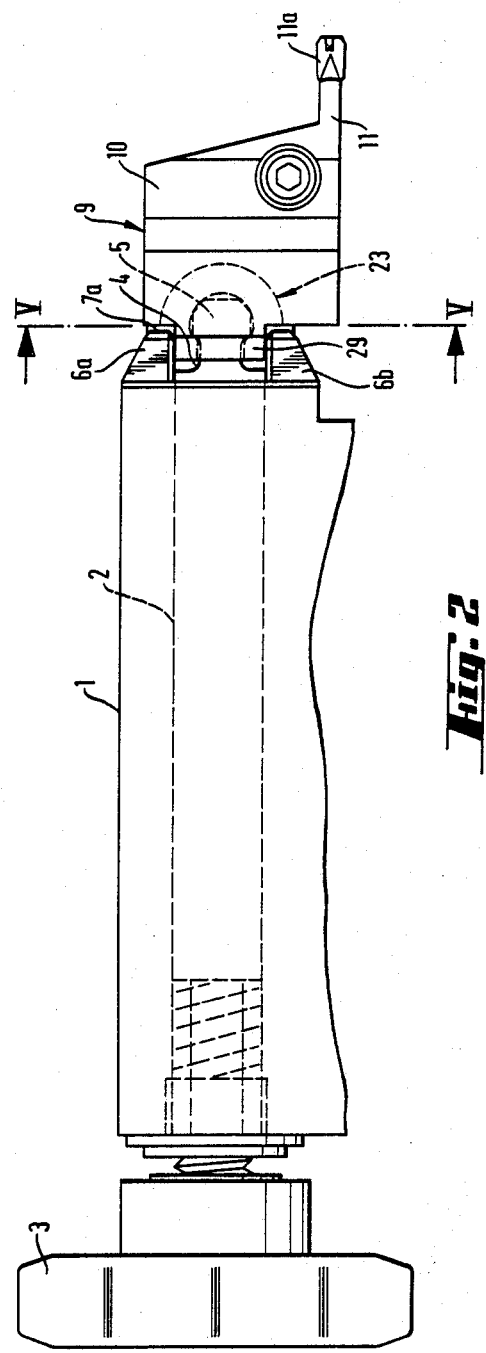
FIG. 2 is a plan view from above of an assembled composite tool including a tool cutter head in accordance with the invention.
Figure 3:
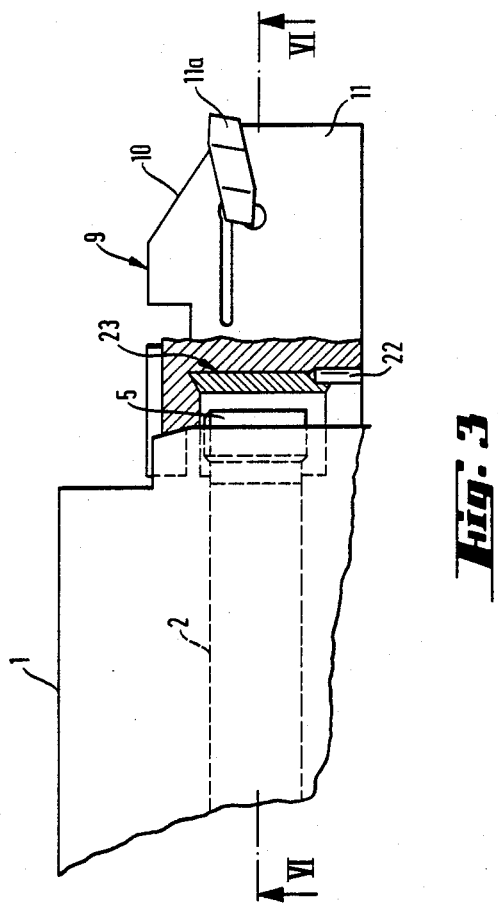
FIG. 3 is a partially sectional side elevation of the assembled composite tool shown in FIG. 2.

Referring to FIGS. 1, 2 and 3 of the drawings, a composite cutting tool comprises an elongated tool holder 1 adapted to be mounted by means (not shown) to a lathe. Extending longitudinally through the tool holder 1 is an elongated drawbar 2 which is coupled at one end thereof to a turning handle 3 and, at an opposite end thereof, via a neck portion 4 to an engaging head 5. Flanking the neck portion 4 and spaced therefrom is a pair of abutment members 6a and 6b having a first pair of transversely directed abutment surfaces 7a and 7b and a second pair of longitudinally directed abutment surfaces 8a and 8b. Depending on the sense of rotation of the turning handle 3 the engaging head 5 is displaced in a direction into or out of the tool holder 1.

A tool cutter head 9 comprises a body portion 10 provided, at one end thereof with means 11 for mounting a cutting insert 11a and being formed at an opposite end thereof with a receiver socket 12 for receiving the engaging head 5 of the tool holder 1.

Figure 4:
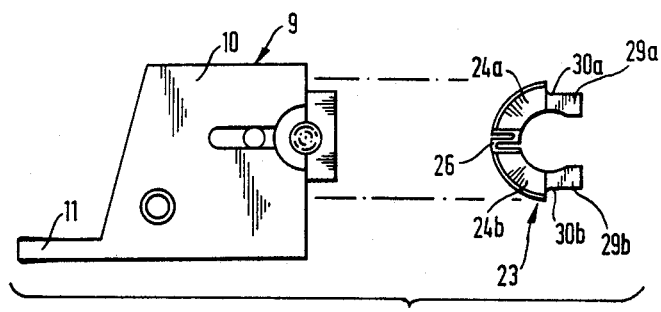
FIG. 4 is an exploded plan view showing the constituent elements of the tool cutter head in accordance with the invention.
Figure 5:
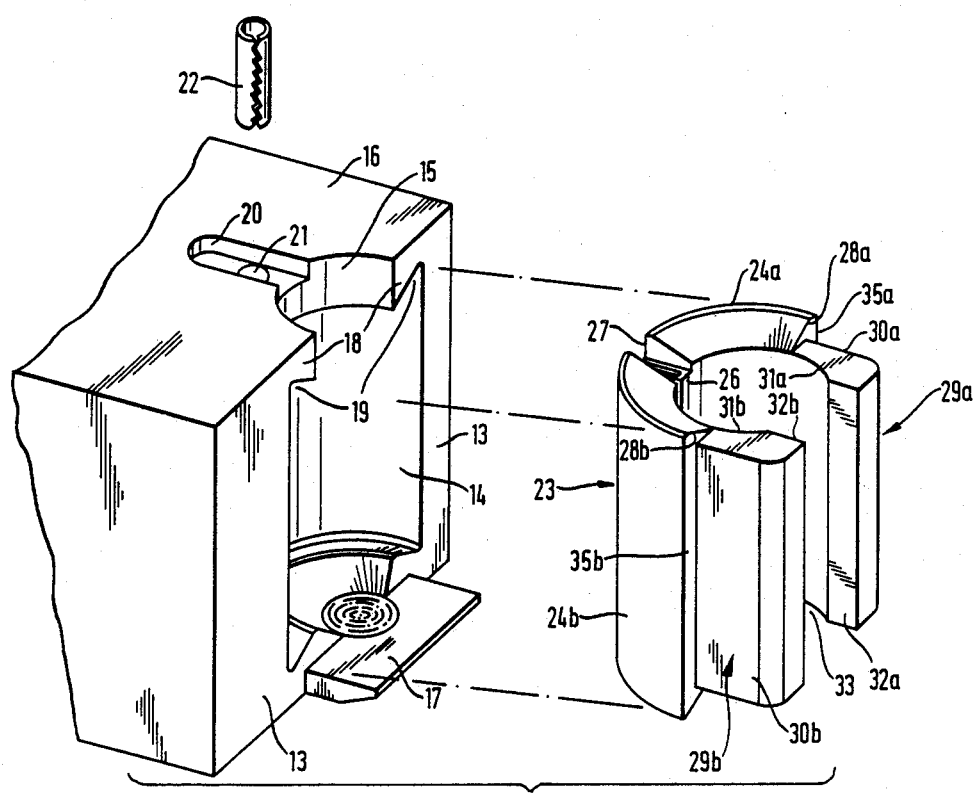
FIG. 5 is an exploded perspective view of the tool cutter head.

Reference will now be made to FIGS. 4 and 5 of the drawings for a detailed illustration of the tool cutter head in accordance with the invention and shown in FIGS. 1 and 2. The tool cutter head 9 comprises the body portion 10, the insert retaining means 11. Formed in an opposite end of the body portion 9 and extending inwardly from a substantially planar end surface 13 of the body portion 9, is a substantially U-shaped recess 14. This communicates via an opening 15 with an upper surface 16 of the body portion and is closed at its opposite end by a closure 17. The upper and lower ends of the recess 14 are bounded by rims 18 which, together with the bounding wall of the recess 14 define dovetail recesses 19. An elongated slot 20 is formed in the upper surface 16 of the body portion and has located therein a bore 21 which extends into the recess 14. Adapted to fit into the bore 21 so as to extend into the recess 14 is a split tubular retaining pin 22.

A substantially U-shaped bushing 23 is adapted to be fitted within the recess 14 in a manner to be described below. The bushing comprises a pair of substantially quadrant shaped limbs 24a and 24b which merge in a common web portion 25. The web portion has formed therein a pair of oppositely directed slits 26 allowing for the relative flexing of the limbs 24a and 24b towards and away from each other. As can be seen in FIG. 5 of the drawings the upper end of the web portion 25 is formed with a recess 27. The upper and lower edges 28a and 28b of the limbs 24a and 24b are dovetail shaped so as to fit into and conform with the dovetail recesses 19 formed in the body portion of the tool cutter head.

The ends of the limbs 24a and 24b remote from the web portion 25 are formed respectively integrally with limb terminal portions 29a and 29b. The outer surfaces 30a and 30b of the terminal portions 29a and 29b constitute substantially planar abutment surfaces 30a and 30b. The inner surface 31a and 31b of the terminal portions 29a and 29b curve inwardly as a continuation of the curvature of the inner surfaces of the limbs 24a and 24b and terminate in a pair of longitudinally directed edges 32a and 32b which define between them a socket entry slot 33 having transverse dimensions less than the transverse dimensions of the socket 12 defined by the limbs 24a and 24b of the bushing.

The assembly of the constituent parts of the tool cutter head shown in FIGS. 4 and 5 takes place as follows: A terminal portion (say 29a) is introduced into the recess 14 so that the upper and lower dovetail portions 28a, 28b enter the upper and lower dovetail recesses 19. The bushing is then rotated within the recess with the dovetail edges 28a and 28b entering steadily further into the dovetail recesses 19 until the terminal portion 29b emerges from the recess so as to project therefrom by an amount equal to the degree of projection of the other terminal portion 29a. When this occurs the web recess 27 is located directly below the bore 21 formed in the slot 20 and the spring retaining pin is pressed through the bore 20 until its lowermost end is located within the web recess 27 thereby preventing the removal of the bushing 23 from the recess.

The mode of assembly of the tool cutter head 9 which has just been described on the tool holder 1 and the clamping of the cutter head 9 against the tool holder 1 will now be described with particular reference to FIGS. 5 through 8 of the drawings.

The tool cutter head 9 is located above the engaging head 5 of the tool holder 1 and is displaced downwardly so as to allow the engaging head 5 to enter the socket 12 defined within the U-shaped bushing via the opening 15. In this condition as seen clearly in FIG. 6 of the drawings, the neck portion 4 of the drawbar 2 is located within the socket entry slot 33 and a pair of tapering surfaces 34 of the engaging head 5 abut the inner curved surfaces 31 of the terminal portions, the surfaces 31 and 34 constituting a pair of coacting cam surfaces. At the same time a pair of flanged shoulders 35a, 35b of the bushing 23 (defining the ends of the limbs 24a and 24b) bear against the transverse abutment surfaces 7a and 7b of the abutment member 6a and 6b of the tool holder. In this position and as clearly seen in FIGS. 6 and 7 of the drawings the end surfaces 13 of the body portion 10 of the tool cutter head 9 are spaced away from the transverse abutment surfaces 7a and 7b of the tool holder.

By turning the handle 3 the drawbar 2 is displaced so as to displace the engaging head 5 thereof inwardly towards the tool holder, and this results in the end surfaces 13 of the tool cutter head 9 being displaced towards and abutting the transverse abutment surfaces 7a and 7b of the tool holder 1. The movement of the tapering surfaces 34 of the engaging head 5 over the inner surfaces 31 of the bushing (constituting coacting cam surfaces) causes the constituent limbs 24a and 24b of the bushing together with the associated terminal portions 29a and 29b to pivot outwardly with respect to the central resilient web portion 25 and this subsequent to the firm clamping of the edge 13 of the tool cutter head against the transverse abutment surfaces 7a and 7b of the tool holder. This outward pivotal displacement of the terminal portions 29a and 29b containues until the latter are firmly clamped against the longitudinal abutment surfaces 8a and 8b of the tool holder. The pivotal displacement of the limbs 24a and 24b is guided by the motion of the circular outer surfaces of the limbs on the inner circular of the recess, the juxtaposed surfaces also constituting effective coacting cam surfaces.

Thus, with a tool cutter head 9 in accordance with the invention and as just described by way of example, the latter can be effectively and readily clamped against the tool holder 1 in such a manner as to avoid relative displacement between these two elements of the composite tool during all normal operating conditions. Furthermore, by virtue of the provision of the terminal portions 29a and 29b which are displaced outwardly so as to clamp the tool cutter head 9 against the longitudinal abutment surfaces 8a and 8b of the tool holder 1 as parts of a separate bushing 23 (and not integrally with the tool cutter head) a more effective displacement of the terminal portions 29a and 29b can be obtained without any significant danger of the terminal portions 29a and 29b being fractured. However, even if such fracture should take place then this does not require the entire replacement of the tool cutter head 9 but merely the replacement of a relatively small inexpensive bushing 23.

It will be realised that various modifications of the structure of the tool cutter head described above can be provided for within the framework of the present invention. Thus, whilst in the embodiment described above the bushing consists of an essentially unitary structure (the limbs 24a and 24b being formed integrally with a common web portion 25) the bushing can equally well be formed of a two component structure, i.e. with separate limbs each of which is retained within the recess by an appropriate retaining pin. In all cases all that is required is that relative resilient displacement of the limbs to and away from each other should be allowed for. Furthermore, whilst in the embodiment described above the bushing 23 has been retained in the recess by means of a retaining pin 22 which is inserted from above, the bushing 23 can equally well be retained by means of a retaining pin which is inserted from the side into a slot formed in a slide wall of the bushing.

Whilst in the embodiment described above the bushing 23 is retained within the recess 14 by a dovetail structure, other means of retaining the bushing within the recess can equally well be used such as, for example, providing the end of the bushing with rectangularly shaped ridges which fit into corresponding rectantularly shaped spots formed in the tool cutter head.

I claim:

1. A tool cutter head adapted to be releasably mounted on a tool holder and comprising a body portion; cutting insert mounting means located at a first end of the body portion; a substantially U-shaped bushing articulatedly mounted in a recess formed in a second end of the body portion and defining a receiver socket adapted to receive and engaging head of a drawbar longitudinally displaceable within the tool holder; juxtaposed surfaces of said recess and said bushing constituting a first pair of coacting cam surfaces; constituent limbs of said bushing being capable of limited displacement towards and away from each other along paths determined by said coacting cam surfaces; limb terminal portions projecting out of said second end and defining at their extremities a socket entry slot having transverse dimensions less than those of the socket and greater than those of a neck portion of said drawbar adjacent said engaging head; transverse abutment surfaces formed on said second end of said body portion on either side of said limb terminal portions and adapted to be juxtaposed with respect to corrsponding transverse abutment surfaces formed on said tool holder; outer surfaces of said limb terminal portions constituting respective, longitudinally directed, abutment surfaces adpated to be juxtaposed with respect to corresponding longitudinally directed, abutment surfaces formed on said tool holder; inner surfaces of said terminal portions being adapted to be juxtaposed with respect to corresponding surfaces on said engaging head and adapted to constitute a second pair of coacting cam surfaces; the arrangement being such that with said engaging head of said drawbar located in said receiver socket, a traction force exerted on said drawbar results in the transverse abutting surfaces of said limb terminal portions being displaced into a clamping abutment with the corresponding transverse abutment surfaces formed on said tool holder.

2. A tool cutter head according to claim 1, wherein said limbs are substantially quadrant shaped.

3. A tool cutter head according to claim 1, wherein said limbs extend from an integrally formed resiliently flexible central web portion of said bushing.

4. A tool cutter head according to claim 1, wherein said bushing is mounted in said recess by way of a dovetailed coupling.

5. A tool cutter head according to claim 1, wherein said bushing is retained in said recess by means of one or more retaining pins which pass through said body portion and extend into a slot formed in the bushing.

* * * * *